UNITED STATES PATENT OFFICE.

THOMAS HILL EASTERFIELD, OF WELLINGTON, NEW ZEALAND.

PRODUCTION OF AMMONIUM SULFATE.

1,072,840. Specification of Letters Patent. Patented Sept. 9, 1913.

No Drawing. Application filed January 2, 1913. Serial No. 739,836.

*To all whom it may concern:*

Be it known that I, THOMAS HILL EASTERFIELD, a citizen of the Dominion of New Zealand, and resident of Talavera Terrace, Wellington, in the Provincial District of Wellington, Dominion of New Zealand, have invented certain new and useful Improvements Relating to the Production of Ammonium Sulfate, of which the following is a specification.

It has long been known that the ammoniacal liquor obtained by washing crude distillation gases such as blast furnace gases, coke oven gases, or coal gas can be made to yield sulfate of ammonia by interaction with calcium sulfate. The chief drawback of existing processes consists in the very large consumption of fuel required in the evaporation of the dilute solution of ammonium sulfate which results. Typical gas liquor contains about 1½% and seldom contains more than 3% of ammonia and after conversion will accordingly not contain above 12% of ammonium sulfate. In a process patented in Great Britain by Feld in 1891 under the Number 27567, the gas is washed with water containing calcium sulfate in suspension, the washing being continued until a sufficiently concentrated solution is obtained.

According to my invention, in order to obtain a concentrated solution of ammonium sulfate I proceed as follows:—The ordinary gas liquor (which consists mainly of a dilute solution of ammonium carbonate) after separation as completely as convenient from particles of tar is agitated with calcium sulfate or is passed through one or more percolators packed with calcium sulfate and the resulting solution of ammonium sulfate is returned to the gas washing apparatus to be recharged with ammonia and carbon dioxid and subsequently again treated with calcium sulfate, the process being continued until a concentrated solution of ammonium sulfate is obtained.

Another method is to concentrate the gas liquor by distillation, a well known process, retaining in the distillate as much carbonic acid as possible, and the resulting concentrated solution is then to be diluted with water to such an extent that during treatment with calcium sulfate no ammonium salts will crystallize out and then to allow the concentrate to react with calcium sulfate either by agitation or percolation. The liquor arising from either of these processes is first submitted to partial distillation so as to drive off and recover any volatile ammonium salts which are returned to be recarbonated and converted to sulfate. The liquor which is now free from sulfated hydrogen is evaporated and the ammonium sulfate recovered.

Either of the methods of carrying out the concentration may be modified by carbonating or desulfurizing or decyanidizing or carbonating and desulfurizing and decyanidizing the liquor before, during or after the process of interaction with calcium sulfate.

The interaction with the calcium sulfate may with advantage be carried out at a temperature higher than that of the atmosphere in order to increase the rapidity of action.

What I do claim and desire to secure by Letters Patent of the United States is:—

1. The herein described process of obtaining ammonia from gases which comprise reacting upon ammoniacal liquor containing ammonium carbonate with calcium sulfate; separating the precipitated calcium carbonate from the solution of ammonium sulfate formed, and thereafter washing gases containing ammonia and carbon dioxid with said solution of ammonium sulfate.

2. The herein described process of making ammonium sulfate which comprises reacting upon ammoniacal liquor containing ammonium carbonate with calcium sulfate; separating the precipitated calcium carbonate from the solution of ammonium sulfate formed, and thereafter washing gases containing ammonia and carbon dioxid with said solution of ammonium sulfate, and thereafter alternately treating said liquor with calcium sulfate and with gases containing ammonia and carbon dioxid, and separating ammonium sulfate from the liquor after the step of treating the same with calcium sulfate.

3. In the process of obtaining solutions of ammonium sulfate from gases containing ammonia and carbon dioxid, the improvement which comprises treating the same body of liquor alternately with calcium sulfate and said gases.

In testimony whereof I have signed my name to this specification in the presence of two witnesses.

THOMAS HILL EASTERFIELD.

Witnesses:
  T. SHAILER WESTON,
  CECIL BALFOUR MELVILLE.